United States Patent [19]
Brooks

[11] Patent Number: 5,564,887
[45] Date of Patent: Oct. 15, 1996

[54] LOG SKIDDER APPARATUS FOR A THREE POINT HITCH

[76] Inventor: Gregory E. Brooks, 951 Williams St., Eugene, Oreg. 97402-1709

[21] Appl. No.: 427,191

[22] Filed: Apr. 24, 1995

[51] Int. Cl.⁶ ........................................ B66C 3/16
[52] U.S. Cl. ................. 414/735; 414/739; 414/920
[58] Field of Search ........................... 414/703, 729, 414/735, 738, 739, 920, 569

[56] References Cited

U.S. PATENT DOCUMENTS

| | | | |
|---|---|---|---|
| 3,342,357 | 9/1967 | Larson | 414/739 X |
| 3,501,035 | 3/1970 | Whiting | 414/739 X |
| 3,841,507 | 10/1974 | Barwise | 414/739 X |
| 4,379,675 | 4/1983 | Muntjasoff et al. | 414/734 |
| 4,451,194 | 5/1984 | Keats et al. | 414/738 X |
| 4,606,694 | 8/1986 | Meisel, Jr. et al. | 414/732 |
| 4,718,816 | 1/1988 | King | 414/739 |
| 4,795,135 | 1/1989 | Scott | 414/739 X |
| 4,808,062 | 2/1989 | Bare | 414/703 |
| 4,993,914 | 2/1991 | Riddle | 414/738 |
| 5,061,150 | 10/1991 | Rentschler | 414/703 |
| 5,405,238 | 4/1995 | Samsel, Jr. | 414/739 X |

FOREIGN PATENT DOCUMENTS

| | | | |
|---|---|---|---|
| 651898 | 11/1962 | Canada | 414/739 |
| 918263 | 4/1982 | U.S.S.R. | 414/739 |
| 1359176 | 12/1987 | U.S.S.R. | 414/739 |
| 2029367 | 3/1980 | United Kingdom | 414/739 |
| 2133771 | 8/1984 | United Kingdom | 414/920 |

Primary Examiner—David A. Bucci
Attorney, Agent, or Firm—James D. Givnan, Jr.

[57] ABSTRACT

A log skidder apparatus includes a frame provided with pivotal attachment points for the reception of the three point hitch components of a tractor. One of the frame carried attachment points is coupled to a hydraulic cylinder for imparting tilting movement to the frame to lift and advance the end of a log being transported into abutment with the frame. A truss of the frame carries a grapple assembly. An upright shaft is journalled in the truss and carries the grapple assembly with the shaft having an arm thereon biased by a spring urging the assembly to a predetermined position to facilitate grapple engagement with a log end. The frame is equpped with plates to confine the log end against displacement from the frame.

8 Claims, 2 Drawing Sheets

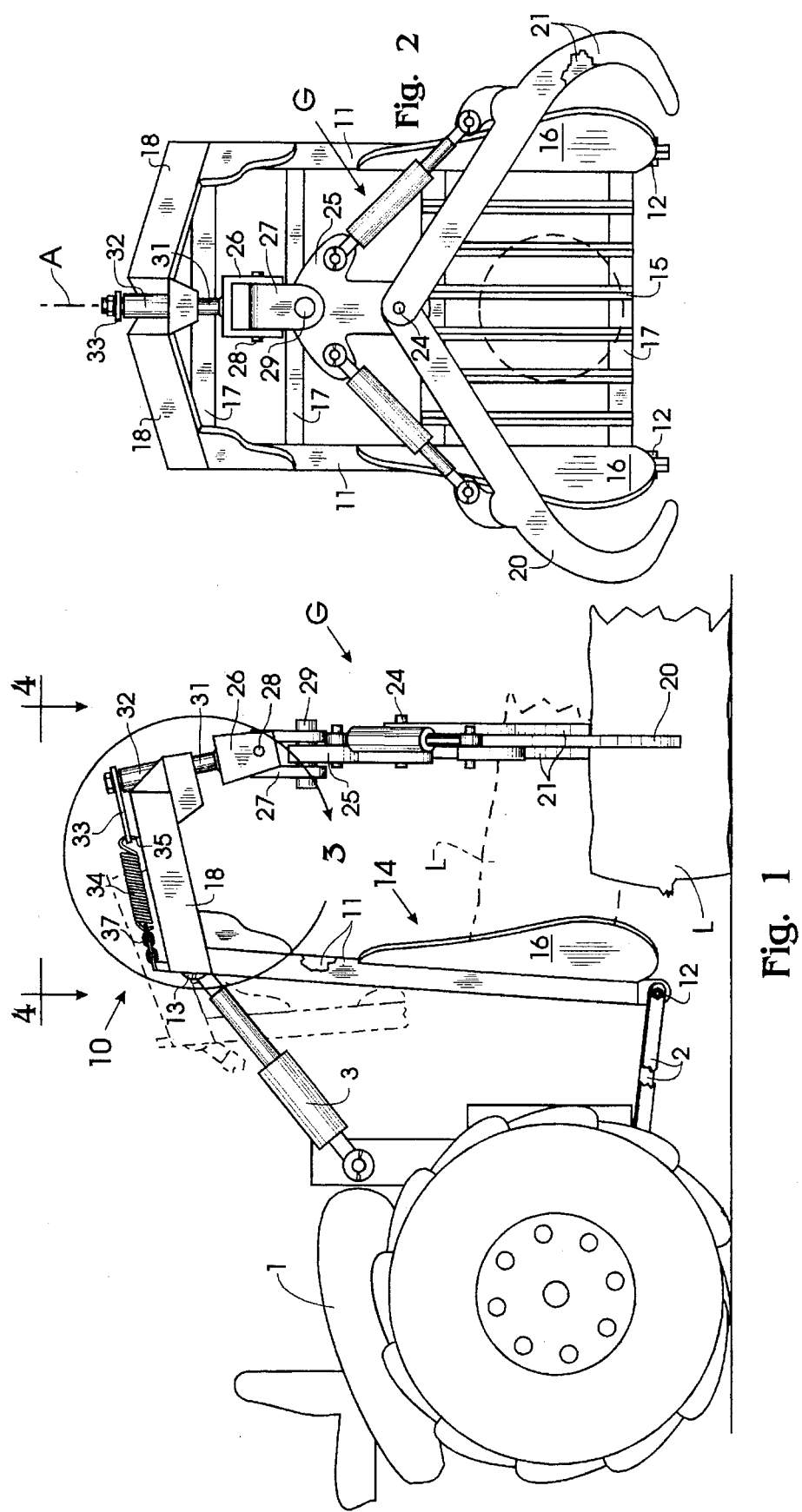

LOG SKIDDER APPARATUS FOR A THREE POINT HITCH

BACKGROUND OF THE INVENTION

The present invention concerns equipment for dragging logs over rough terrain to a log truck loading site.

Commonly the above is accomplished by the use of a vehicle termed a skidder which is wheel or track equipped with a grapple for log engagement. Such vehicles are suited primarily for the single task noted and are equipped with complex hydraulic systems for vehicle drive and grapple operation making their use practical only in full time, high volume logging operations.

With the advent of limited timber being available for logging and with log shortages and higher log prices now being common more small scale logging efforts are now taking place. For example, owners of small tracts of timber are often primarily farmers with farm tractors of the type including a three point hitch for the attachment of various farm implements. Such tractors are not usable for the skidding of logs to a collection or loading site which requires that the forward end of the log be elevated somewhat to avoid hanging up on ground obstacles. Ownership or leasing of a single purpose log skidder is cost prohibitive when but a relatively small number of logs are involved.

The prior art log skidders, above discussed, do have grapple postioning capability which require costly hydraulic components including pumps, valves, cylinders, etc., not suitable for farm tractor installation.

SUMMARY OF THE PRESENT INVENTION

The present invention is directed toward the provision of a log transporting attachment for farm tractors of the type having a three point hitch.

The tractor attachment includes a frame readily attachable to and supported by tractor hitch components and on which frame is carried a grapple assembly positioned about an upright axis for log attachment by resilient means. Prior to log attachment, the grapple is automatically stabilized in a position transverse to the log axis by such resilient means in place on the frame of the present attachment. Accordingly log pickup is greatly facilitated and can be achieved without the use of a second person or requiring the tractor operator to leave the tractor. The hydraulic capability of large farm tractors is sufficient for actuating grapple arm cylinders operation when such capabilities is not diminished by the operation of grapple positioning cylinders.

Important objectives include the provision of a log moving apparatus for use with a three point hitch equipped tractor and having a grapple assembly positioned by a resilient component without reliance on a hydraulic component; the provision of a log moving apparatus suitable for use on most medium sized or larger farm tractors to enable farmers to accomplish small scale logging efforts without use of costly log skidding equipment or contracting for the services of professional loggers which may render such logging efforts economically impractical; the provision of a log moving attachment which is readily coupled to a medium size or larger farm tractor using the tractor three point hitch and the tractor hydraulic components for positioning a log lifting frame of the apparatus.

BRIEF DESCRIPTION OF THE DRAWINGS

In the drawings:

FIG. 1 is a side elevational view of a tractor with the present attachment thereon;

FIG. 2 is a rear elevational view taken from the right side of FIG. 1;

DETAILED DESCRIPTION OF THE PREFERRED EMBODIMENTS

Figure 3:
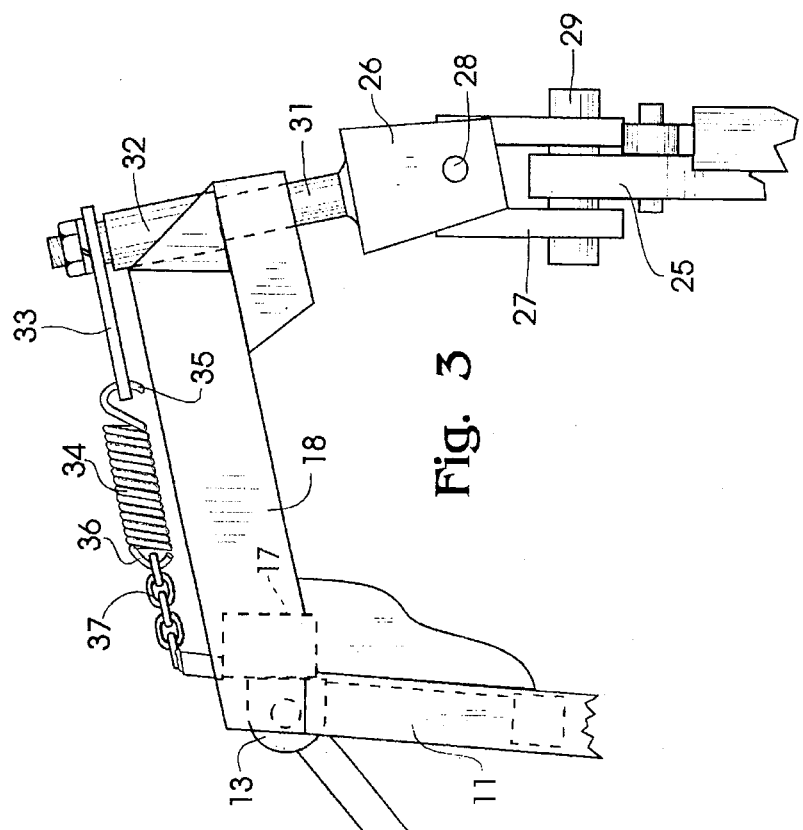
FIG. 3 is an enlarged fragmentary view of a portion of FIG. 1 encircled at 3.
Figure 4:
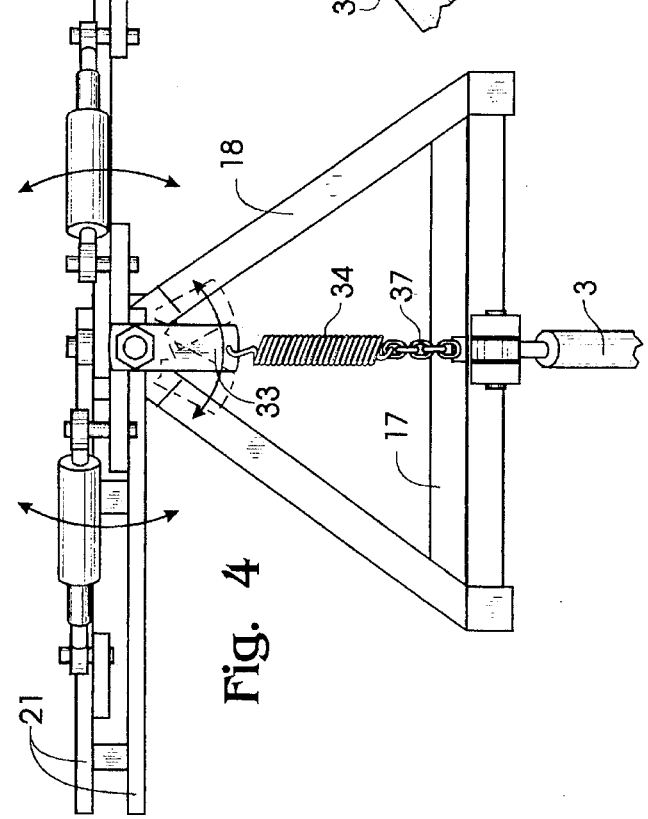
FIG. 4 is a plan view taken along line 4—4 of FIG. 1.

With continuing attention to the drawings wherein applied reference numerals indicate parts similarly hereinafter identified, the reference numeral 1 identifies a tractor of the type termed a farm tractor by reason of widespread acceptance for agricultural purposes.

Tractor 1 includes a pair of rearwardly trailing arms 2 and a hydraulic cylinder 3 with the arms powered and adjustable normally for attachment to various implements. In view of such hitches being in wide use further description is believed unnecessary.

With attention now to the present attachment, the same is indicated generally at 10 and includes a frame having upright members 11 with a pair of pivotal couplings at 12 for arm attachment and a like coupling at 13 for reception of hydraulic cylinder 3.

The frame includes log end retention means generally at 14 having a plate structure carried by upright members 11 with ribs at 15 to minimize lateral displacement of a log end when in abutment therewith. A log L being transported will have its forward end confined by side plates 16 which diverge rearwardly from frame members 11. Activation of three point hitch components 2 and 3 will result in elevating frame member 11 while cylinder 3 may tilt frame member forwardly toward tractor 1 to the broken line position of FIG. 1 to achieve butting of an elevated log end against log retention means 14. Frame crossmembers are at 17. Rearwardly projecting convergent frame members 18 form a truss.

A grapple assembly is indicated generally at G with arms at 20–21 powered by double acting hydraulic cylinders 22–23 about an arm pivot 24. A grapple base plate 25 is carried by a universal coupling having clevises 26–27 and pivot pins 28–29. An upright shaft 31 on clevis 26 extends upwardly through a sleeve bearing 32 and is suitably retained therein for grapple assembly movement about an upright axis A. Secured in place on the exposed upper end of shaft 31 is an arm 33 apertured at its distal end to receive an end 35 of an extension spring 34. A remaining spring end 36 is in engagement with a chain segment 37 which is anchored to uppermost crossmember 17 of the frame. Accordingly grapple assembly G is suspended, in a yieldable manner, generally transversely of a centerline of tractor 1 and the three point hitch components thereon. Automatic positioning of the unloaded grapple takes place by the action of spring 34 to greatly facilitate load engagement by the grapple whereafter rotational movement of the grapple may occur about axis A during skidding of the log to a truck loading site.

With attention again to grapple assembly G, grapple arm 21 is preferably a double arm or at least of greater weight than the remaining arm to allow arm 21 to assume a somewhat lower position than companion arm 20 to facilitate placement of the elevated arm 20 over a log when the log end is off the ground or askew to the tractor centerline.

With the grapple assembly firmly gripping log L the frame 10 is tilted by cylinder 3 to cause forwardly displaced grapple assembly to drag the log into abutment with log retention means 14.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A log skidder apparatus for attachment to a tractor having three point hitch components and comprising, a frame having upright members and a truss supported thereby, pivotal attachment points vertically and horizontally spaced from one another to receive the three point hitch components of the tractor, one of said points located adjacent said truss for tilting of the frame about the horizontally spaced attachment points, said frame including rearwardly diverging side plates to inhibit lateral movement of a log end in abutment with said frame, a grapple assembly below said truss and offset rearwardly from said frame, and grapple assembly suspension means on said truss including a shaft journaled in a bearing for rotational movement about an upright axis, an arm on said shaft, resilient means acting on said arm urging the arm and said grapple assembly to a predetermined position relative said frame to facilitate log attachment.

2. The apparatus claimed in claim 1 wherein said resilient means is a coiled extension spring.

3. The apparatus claimed in claim 2 additionally including a chain segment attached at one of its ends to said spring to permit lateral displacement of the spring axis during arm movement.

4. The apparatus claimed in claim 1 wherein said grapple assembly includes arms, one of said arms being a double arm and of greater weight than a remaining arm of the grapple assembly whereby when the grapple is in an unloaded condition said remaining arm assumes an elevated position relative to said double arm to facilitate placement of the remaining arm over a log.

5. In combination, a tractor having three point hitch components, a log skidder apparatus for attachment to said tractor and specifically said three point hitch components, said apparatus including a frame having upright frame members and a truss supported thereby, said truss including rearwardly projecting members, pivotal attachment points vertically and horizontally spaced from one another on said frame for attachment to the three point hitch components of said tractor, one of said points located adjacent said truss for imparting tilting movement to said frame about the horizontally spaced attachment points, a grapple assembly below said rearwardly projecting members of the truss, grapple assembly suspension means on said truss including a shaft journaled in a bearing on said truss for rotational movement about an upright axis, an arm on said shaft and spring means acting on said arm urging the arm and said grapple to a predetermined position relative said frame to facilitate log engagement, and tilting movement imparted to said frame in a forward direction serving to elevate a log engaged by said grapple assembly.

6. The combination claimed in claim 5 additionally including yieldable means attached to said spring means to permit lateral displacement of the spring axis during arm movement.

7. An attachment for a three point hitch of a tractor for dragging an elongate article along a ground surface and comprising, a frame including a truss and lower and upper attachment fittings for reception of the three point hitch of the tractor to enable rotational movement of the frame about the lower attachment points, log retention means against which the article may abut and bearing means on said truss, a grapple assembly carried by said bearing means, resilient means on said truss, arm means coupling said resilient means to said grapple assembly, and said reslient means acting on said grapple assembly to position the grapple assembly when in an unloaded condition to facilitate grapple assembly engagement with the elongate article.

8. The attachment claimed in claim 7 wherein said resilient means is an extension spring, and yieldable means on said truss and coupling one end of said extension spring to said truss.

* * * * *